United States Patent
Canny (10) Patent No.: US 10,798,931 B1
(45) Date of Patent: Oct. 13, 2020

(54) FISH BITE ALERT SYSTEM

(71) Applicant: Martin W. Canny, Chenango Forks, NY (US)

(72) Inventor: Martin W. Canny, Chenango Forks, NY (US)

( * ) Notice: Subject to any disclaimer, the term of this patent is extended or adjusted under 35 U.S.C. 154(b) by 0 days.

(21) Appl. No.: 16/576,996

(22) Filed: Sep. 20, 2019

(51) Int. Cl.
*A01K 97/12* (2006.01)
*A01K 97/01* (2006.01)
*A01K 97/10* (2006.01)

(52) U.S. Cl.
CPC ............ *A01K 97/125* (2013.01); *A01K 97/01* (2013.01); *A01K 97/10* (2013.01)

(58) Field of Classification Search
CPC ........ A01K 97/01; A01K 97/10; A01K 97/12; A01K 97/125
USPC .................................................. 43/2, 17, 21
See application file for complete search history.

(56) References Cited

U.S. PATENT DOCUMENTS

| | | | | |
|---|---|---|---|---|
| 2,785,494 A * | 3/1957 | Eaton | ................... | A01K 97/125 43/17 |
| 3,798,630 A * | 3/1974 | Crosthwait | ............ | A01K 97/01 340/279 |
| 4,086,716 A * | 5/1978 | Donahue | ................ | A01K 97/10 248/533 |
| 4,195,433 A * | 4/1980 | Engman | ................ | A01K 97/125 43/17 |
| 4,590,701 A * | 5/1986 | Rivers | .................... | A01K 97/10 43/17 |
| 4,660,316 A * | 4/1987 | Gamelin | .............. | A01K 97/125 43/17 |
| 8,453,373 B2 * | 6/2013 | Gordon | .................. | A01K 97/10 248/534 |
| 10,154,659 B2 * | 12/2018 | Smith | ........................ | A45F 3/44 |
| 10,412,949 B2 * | 9/2019 | Mazzitelli | .............. | A01K 97/10 |
| 2003/0172577 A1 * | 9/2003 | Allen | .................... | A01K 97/125 43/17 |
| 2017/0086443 A1 * | 3/2017 | Rogers | .................... | H04W 4/80 |
| 2019/0343105 A1 * | 11/2019 | Best | ........................ | A01K 97/10 |

* cited by examiner

*Primary Examiner* — Magdalena Topolski
*Assistant Examiner* — Marisa V Conlon
(74) *Attorney, Agent, or Firm* — Law Office of Mark Levy (57) ABSTRACT

A fish bite alert system. A Y-shaped fishing rod holder is provided having two upper portions spaced apart from one another and a vertical post having a proximal end and a distal end, the vertical post extending from a center location of the Y-shaped fishing rod holder and an optional, removable cone disposed proximate the distal end of the vertical post. An electrical speaker unit is mounted to the Y-shaped fishing rod holder. An LED is attached to each of the upper portions of the fishing rod holder. A retractable, spring-loaded trigger assembly is supported by the Y-shaped fishing rod holder and electrically connected to the power supply via a momentary switch. In another embodiment, a detachable ladder assembly supports the fishing rod holder and includes a folding ladder base with extendable support members having distal ends and a plurality of extension arms operatively connect thereto.

15 Claims, 5 Drawing Sheets

FISH BITE ALERT SYSTEM

RELATED PATENT APPLICATION

The present application is related to U.S. patent application Ser. No. 15/681,608 filed Aug. 21, 2017 for FISH BITE ALERT SYSTEM, now abandoned and hereby incorporated by reference.

FIELD OF THE INVENTION

This invention relates to fish bite indicators and, more particularly, to a fish bite alert system to indicate to a fisherman at a remote location when a fish strikes or has struck a fishing lure, hook, or bait.

BACKGROUND OF THE INVENTION

Fishing remains an extremely popular leisure activity during nearly every season of the year. From the opening day of the spring fishing season through the bleak winter ice fishing season, anglers can usually be found on some body of water throughout virtually any geographic region. Despite its overwhelming popularity, success infishing often requires extreme levels of patience and vigilance. However, many fishermen do not like to constantly hold their fishing rod and reel assemblies during this waiting process, but would rather secure such assemblies in place while they engage in other activities sometimes remote from the fishing site. Furthermore, holding a pole for a significant amount of time can be tiring for the angler. This is especially true during the ice fishing season. Cold temperatures and high winds can make the process of holding onto a fishing pole a very difficult experience.

In order to avoid constantly holding a fishing pole, anglers fishing from shore may prop their fishing rod(s) up with rocks or sticks or whatever happens to be convenient. Likewise, fishers that fish from the pier typically prop their rods up against the pier railing, between rails or in the railing itself. These makeshift supports allow the angler's hands to be free to attend to other tasks until a fish strike is made. Equipment has been developed that alerts a fisherman to a strike on a line he is not holding. For example, several designs of tip-ups that raise a flag upon a strike are commonly employed by ice fisherman.

Numerous ice fishing devices have been developed to assist the fishermen during the winter months. Tip-ups and tip downs are known in the art and provide devices that allow fishermen to place his or her rod in a support structure without the need to constantly monitor the line. Many of such fish bite indicators have failed to become popular because of their tendency to be either ineffective or so elaborate that they are too costly to the average sports fisherman.

It is also known to use a light, often in combination with a sound device, for signaling a fisherman of a strike. One known device employs a bracket that includes a tube for holding a fishing pole handle. Movement of the handle within the bracket under the tug of a fish on the line closes an electrical contact. Voltage from a battery then lights a lamp and energizes a sound device.

DESCRIPTION OF RELATED ART

U.S. Pat. No. 4,633,608 issued to Savarino for FISH STRIKE DETECTOR on Jan. 6, 1987 describes a fish strike detector that has an arm mounted to an electrical actuator switch. A fishing line is looped over the arm. A slight increase in the force in the line is sufficient to displace the arm and thereby actuate the switch to close an electrical circuit. The circuit includes visual and audio indicators that signal a fisherman of the strike on his line. The electrical circuit is enclosed in a case that is releasably connected to a location most suitable for the application. The toggle of the actuator switch is adapted to removably mount a variety of interchangeable actuator arms. The detector is suitable for use with ice fishing tip-ups. In that application, the tip-up mast the actuator arm are connected by tubes placed over the free ends of the mast and arm; the tubes are joined by a flexible string. Releasing the mast by a strike tightens the string to displace the actuator arm.

U.S. Pat. No. 5,396,726 issued to Zepeda, Sr. for FISH BITE INDICATOR on Mar. 14, 1995 describes a fish bite indicator in combination with a fishing rod and reel to give an audible and/or a visual signal when the fishing line is under sufficient state of tension. An oscillating arm of the indicator extends below the rod. The fishing line is threaded in a loop at the end of the oscillating arm below the rod in such a way to cause the arm to move upward toward the rod when the line has sufficient tension to indicate a fish strike. The other operative elements of the indicator include an on/off switch, a switch activating cam that is attached to a portion of the oscillating arm for activating the on/off switch, an alarm means electrically connected to the switch for, and a battery power source for the alarm means.

U.S. Pat. No. 6,708,441 issued to Dirito for FISH BITE DETECTOR on Mar. 23, 2004 describes a device for detecting the presence of a fish on a fishing line, comprising a sensor for measuring tension on the fishing line and generating an electronic signal related thereto. The signal is processed by a filter circuit which removes signal components caused by environmental conditions such as winds, wave and current action, boat drift or snags. The filter circuit produces a signal output only if the tension reading is characteristic of a fish bite on the line. The preferred form of the detector includes two parts: a detecting and transmitting device for attachment to a fishing rod, and a receiving device which also functions as a storage box. A rotatable control is provided for adjusting the sensitivity of the device. The filter output is encoded by the transmitting device, and transmitted as radio waves. The radio waves are received by the receiving device, converted back into an electric signal and decoded. When an appropriate signal is received, either a buzzer or a vibrator is activated to alert the user that a fish is on the line. A toggle switch enables the user to choose whether the buzzer or the vibrator will be activated.

U.S. Pat. No. 7,395,628 issued to Rayfield for MULTI-USE FISHING ROD HOLDER WITH ALARM on Jul. 8, 2008 describes a fishing system with audio and visual signals capable of use with both tip ups and tip downs. The fishing system includes a tower like tubular support extending from a base member configured to receive at least on tip down. The tubular support includes a tubular visual signal housed at a location on the support and an audio signal housed within the support. The tubular support includes a first wiring outlet configured for wiring a switch on the tip downs to the audio and visual signals and a second wiring outlet for wiring a switch on the tip ups to the audio and visual signals.

U.S. Pat. No. 4,195,433 issued to Engman for UTILITY SIGNAL DEVICE on Apr. 1, 1980 describes a utility signal device adapted for use adjacent a body of water to resiliently support an end portion of a fishing rod thereon. The signal device comprises a housing having opposite ends and a chamber formed therein with a battery positioned in the chamber. A buzzer is mounted in the chamber and is electrically connected to the battery. A fishing rod holder is movably mounted in one end of the housing and is adapted to support an end portion of the fishing rod thereon. The fishing rod holder has a buzzer activator secured thereto which extends into the housing and which is movable into position to complete a circuit with the battery and the buzzer in response to a force on the end portion of the fishing rod. A pair of lights are provided on the housing on opposite sides of the fishing rod holder whereby the light housings provide a lateral restraint for the fishing rod. A three-way switch is movably mounted in the housing and is electrically connected to the lights and buzzer to permit the selective activation of either of the lights. One of the lights also is simultaneously eliminated when the buzzer is activated. A pair of ground stakes is removably stored within the housing and may be secured to the base of the housing to support the housing during fishing operations. Alternately, the four-way switch is provided to permit selective activation of the buzzer or one light through a rod actuated switch, or activation of either of the lights.

U.S. Pat. No. 8,695,268 issued to Gouthro, et al. for METHOD AND APPARATUS FOR HOLDING FISHING ROD on Apr. 15, 2014 describes an apparatus including a stake device for driving into a ground surface, a first device having a cavity into which a fishing rod handle can be inserted, and an alarm device. The stake device may be attached to or detached from the first device. The alarm device is triggered when the fishing rod handle is within the cavity of the first device and is sufficiently jostled as a result of a fish tugging on a fishing line connected to the fishing rod handle The first device may include a first compartment and a second compartment, wherein the first compartment fits within the second compartment, and the cavity is within the first compartment. The alarm device may include a first metal conductor attached to a periphery of the first compartment, and a second metal conductor attached to an interior of the second compartment.

U.S. Pat. No. 2,785,494 issued to Eaton for FISH POLE REST FOR NIGHT FISHING on Mar. 19, 1957 describes a fish pole rest that includes a leg portion insertable into the ground and spaced upper arm portions. An electrical contact plate on the body member closes an electrical circuit to light a bulb.

U.S. Pat. No. 5,010,678 issued to Peck, et al. for BITE INDICATORS on Apr. 30, 1991 describes apparatus for sensing movement of a fishing line when a fish takes the bait on the line and includes a casing fittable to bank rod at a desired angle and having an opening for receiving a fishing rod and a slot which receives the fishing line. A stylus part of a sensor extends into the slot and the slot walls may be shaped to guide the line into engagement with the stylus. The stylus passes through a water resistant/impermeable sheath into the casing in which it is coupled to a sensing device operable to generate or modulate a voltage when it is moved or vibrated. An electronic circuit is provided in the casing to generate an audible and visible indication of line movement and includes a tone sounder carried in and LEDs mounted on the casing. The sensing device may comprise a piezoelectric device or a vibration sensitive switch operable to generate a voltage when vibrated, or a (infrared) light source/sensor arrangement including a light modulating element attached to the stylus. The electronic circuit includes a transistor switch operable in response to the sensor output to enable LED and tone sounder driver circuits. The output of the sensor maybe amplified and (manual) switch means may be provided operable to latch the transistor in a conductive state. Variable resistors are provided for the (manual) adjustment of the pitch and volume of the audible output and the sensitivity of the indicator and means may be included for increasing this sensitivity for a period following a bite. An LED and the tone sounder driver may comprise free running oscillators.

U.S. Pat. No. 3,798,630 issued to Crosthwait for FISHING LINE MOTION SENSING ALARM on Mar. 18, 1974 describes a spring-loaded, clothespin-type clip with a string clutching member movable by string movement to operate a switch mounted on the clip. The clip is securable to a mounting post on a box containing a power supply and speaker for energization of the speaker in response to string movement. A fishing rod can be mounted in or beside the clip, and the clip is mountable wherever there is a surface to which it can be clipped.

U.S. Pat. No. 6,341,443 issued to Watford, et al. for FISHING STAND WITH AN ALARM on Jan. 29, 2002 describes a fishing stand used to support at least one fishing rod that provides an audible and/or visual signal when a fish strikes. The stand is a T-shaped tubular adjustable apparatus with a tripod base used to hold up the apparatus and rod(s) on any type of terrain. The stand preferably includes a detachable audible and/or visual signaling device. The stand supports the upper end of the rod above a switch connected to the stand. The signaling device is actuated by a sufficient downward force on one or more fishing rods above the switch.

U.S. Pat. No. 7,454,861 issued to Keibler for FISHING LINE RELEASE AND BITE ALARM APPARATUS on Nov. 25, 2008 describes a two-way pre-bite tension adjustment and fishing line release and fish bite alarm apparatus that includes a non-electrically conductive body housing a battery and an electrically energized auditory-visual alarm. A two-way pre-bite fishing line tensioning mechanism utilizing a frictional tensioning screw together with the leverage gained by a thin elongated flat rotatable truncated U-shaped tensioning lever-alarm activation member to control an electrical switch member to release the fishing line and emit an auditory-visual signal upon a fish taking bait attached to the fishing line.

U.S. Pat. No. 6,763,630 issued to Jenkins for FREE STANDING FISHING ALARM on Jul. 20, 2004 describes a free standing fishing alarm in which the head or tail member(s) may be threadably attached to the body member, creating a water tight environment for the circuitry and associated components, or removed from the body member to allow service and maintenance of the device. The body member internally houses the circuitry, including batteries, and the lighting and audible signaling means. The body member externally houses a clamp means, a toggle switch, a fastening means, and two opposable ends with threads for receiving the head and tail members so as to provide a unified device. A user can simply attach the device to a fishing rod or a stake, cast the fishing line, place the line within the clamp means, flip the toggle switch "on" and wait for the "big one" to strike.

U.S. Pat. No. 4,794,719 issued to Rabino for FISHING ROD ALARM DEVICE on Jan. 3, 1989 describes a fishing alarm used with a fishing rod and reel that includes a case clamped to the rod. An alarm circuit is mounted to the case and includes, in series, first and second signal contacts, a light and buzzer combination, a battery, and an enabling switch. The first signal contact includes a pair of recessed contact elements positioned between outwardly extending support surfaces. The second signal contact includes a pair of protruding, movable contact elements spring biased towards the recessed contact elements. The recessed and protruding contact elements are sized and positioned so to complete the circuit when engaged. When the fishing line is placed between the support surfaces and the protruding contact elements, the protruding and recessed contact elements are kept separated. When a fish bites, the line tension increases to pull the line from between the contacts to permit the light and buzzer to operate. Since the fishing line only touches one of the two contact elements, false alarms from a wet line are eliminated.

U.S. Pat. No. 5,943,808 issued to Bryant for FISH POLE ALARM MECHANISM on Aug. 31, 1999 describes a fishing pole that has a handle, a reel for supplying fishing line to the pole, and a pair of normally closed switch contacts which project into a recess in the forward end of the handle where registering portions of the contacts are resiliently engaged with each other. The resiliently engaged portions of the contacts register with a slot which connects the recess to the exterior of the handle. A portion of the fishing line is disposed to be inserted manually through the slot and between the resiliently engaged portions of the contacts to effect temporary disengagement thereof during still-fishing with the pole. When a fish bite or strike causes the portion of the fish line to be withdrawn from between the normally engaged portions of the contacts, an alarm on the pole is energized to warn the person fishing.

SUMMARY OF THE INVENTION

In accordance with the present invention, there is provided a standalone fish bite alert system. A Y-shaped fishing rod holder is provided having two upper portions spaced apart from one another and a vertical post having a proximal end and a distal end, the vertical post extending from a center location of the Y-shaped fishing rod holder and an optional, removable cone disposed proximate the distal end of the vertical post. An electrical speaker unit is mounted to the Y-shaped fishing rod holder. An LED is attached to each of the upper portions of the fishing rod holder. A retractable, spring-loaded trigger assembly is supported by the Y-shaped fishing rod holder and electrically connected to the power supply via a momentary switch. In another embodiment, a detachable ladder assembly supports the fishing rod holder and includes a folding ladder base with extendable support members having distal ends and a plurality of extension arms operatively connect thereto.

It is therefore an object of the invention to provide a fish bite alert system that alerts a fisherman to a strike on a line he is not holding.

It is also an object of the invention to provide a fish bite alert system that provides light in combination with a sound device, for signaling a fisherman of a strike.

It is a further object of the present invention to provide a fish bite alert system tip-up that signals a fish strike to a fisherman at a remote location.

It is a further object of the present invention to provide a fish bite alert system that is affordable for the average fisherman.

These and other objects and advantages of the present invention are more readily apparent with reference to the following detailed description and the accompanying drawings.

BRIEF DESCRIPTION OF THE DRAWINGS

A complete understanding of the present invention may be obtained by reference to the accompanying drawings, when considered in conjunction with the subsequent detailed description, in which.

Like reference numerals refer to like parts throughout the several views of the drawings.

DETAILED DESCRIPTION OF THE PREFERRED EMBODIMENT

Although the following detailed description contains specific details for the purposes of illustration, those of ordinary skill in the art will appreciate that variations and alterations to the following details are within the scope of the invention. Accordingly, the exemplary embodiments of the invention described below are set forth without any loss of generality to, and without imposing limitations upon, the claimed invention.

The fish bite alert system of the present invention includes a Y-shaped fishing rod holder having two upper portions spaced apart from one another and a vertical post having a proximal end and a distal end, the vertical post extending from a center location of the Y-shaped fishing rod holder and an optional, removable cone disposed proximate the distal end of the vertical post. An electrical speaker unit is mounted to the Y-shaped fishing rod holder and an LED is attached to each of the upper portions of the fishing rod holder. A retractable, spring-loaded trigger assembly is supported by the Y-shaped fishing rod holder and electrically connected to the power supply via a momentary switch.

Figure 1:
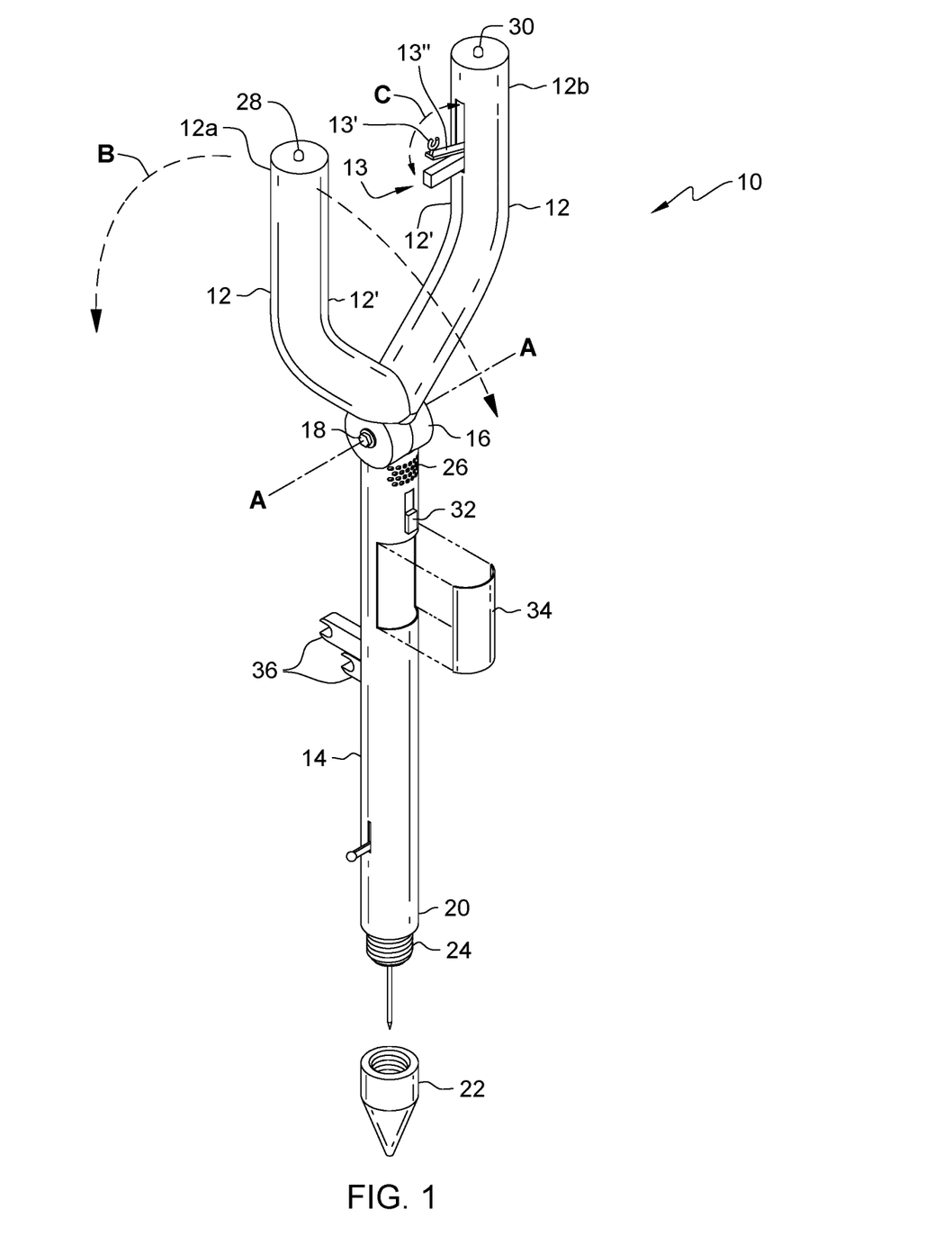
FIG. 1 is a perspective view of the fish bite alert system in accordance with the present invention.

Referring now to FIG. 1, there is shown a perspective view of the fish bite alert system in accordance with the present invention generally at reference numeral 10. An upper portion 12 of the apparatus has two upper extremities 12a, 12b and a vertical post 14 extending downwardly from the lower center thereof and attached thereto by a rotatable joint 16 secured by a joining screw 18 and manually-operated wingnut 19, in a manner well known in the art. Upper portion 12 is thus rotatable about axis A-A in the directions shown by arrows B.

Figure 2:
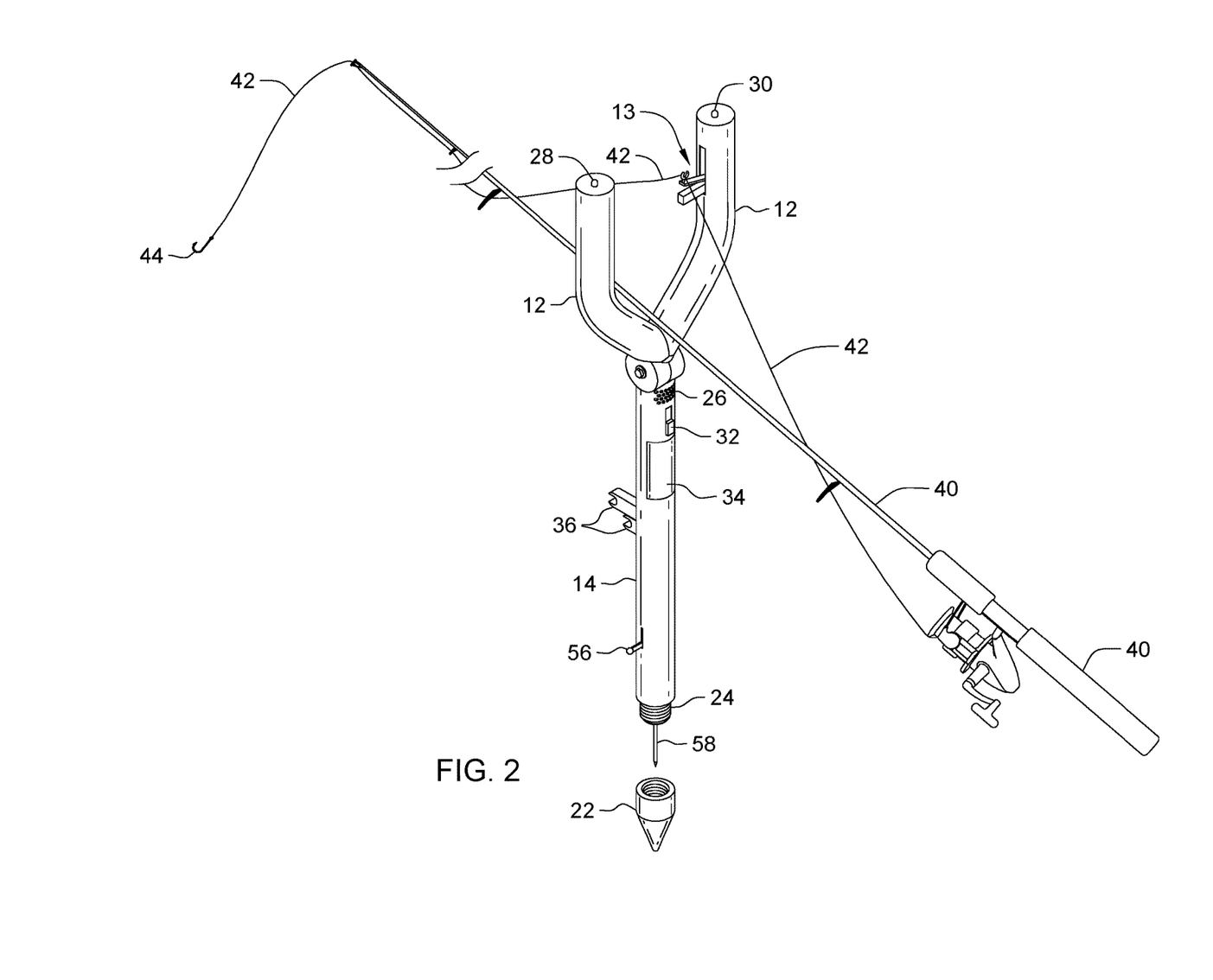
FIG. 2 is a schematic view of the fish bite alert system shown in FIG. 1, supporting a fishing pole in situ.

At the distal end 20 of vertical post 14 is a removable cone 22 for inserting into dirt or sand, not shown. Cone 22 is removably attached to distal end 20 of vertical post 14 by means of threads 24 formed in vertical post 14 and internally (not shown) in cone 22. When fish bite alert system 10 is used on a solid, impermeable surface, such as a boat deck or dock, not shown, cone 22 can be unscrewed and removed from vertical post 14. Fish bite alert system 10, therefore, is a standalone apparatus that is not attached to a fishing pole 40 (FIG. 2).

Mounted on the center, lower part of upper portion 12 is an electrical speaker or buzzer 26, discussed in greater detail hereinbelow. Attached to both upper extremities 12a, 12b of upper portion 12 are two light-emitting diodes (LEDs) 28, 30, respectively.

A power switch 32 is mounted on vertical post 14, as is a snap-in panel 34 that covers and protects two, nested dry cell batteries, not shown, which are AA or AAA batteries in the preferred embodiment.

Swivably disposed at an inner surface 12' of one of upper extremities 12a, 12b is a retractable, spring-loaded trigger assembly 13 having a U-shaped support 13' attached to a rigid member 13", retractable trigger assembly 13 being swivable between extended and retracted positions, as shown by arrows C. The force needed to activate trigger assembly 13 can be adjusted by adjustment means well known in the art. Such force adjustment can be "dialed in" at one of a predetermined number of settings or can be infinitely adjustable. In this way, fish bite alert system 10 can be set to alert a person when a fish strikes, but not when mere waves affect fishing line 42.

A set of base clips 36 is fixedly attached to vertical post 14 and described in greater detail hereinbelow.

Referring now to FIG. 2, there is shown fish bite alert system 10 in situ with a conventional fishing rod 40 and corresponding fishing line 42 extending therefrom. A fish hook 44 is attached to the distal end of fishing line 42. Fishing rod 40, fishing line 42, and fish hook 44 are no part of the present invention.

Figure 4:
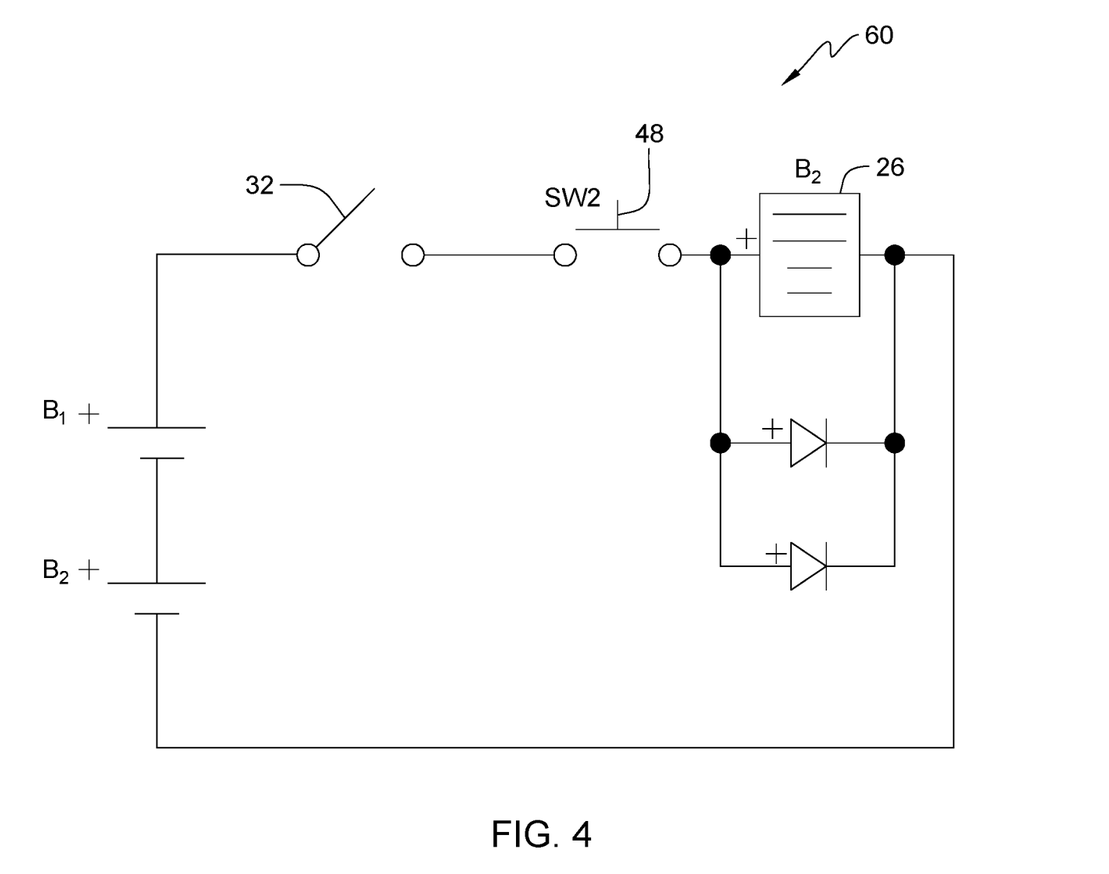
FIG. 4 is a schematic circuit diagram of the electrical connections among the components of the fish bite alert system.

As shown in FIG. 2, part of fishing line 42 is withdrawn from fishing rod 44 to loop around retractable, spring-loaded trigger assembly 13 (FIG. 1) and, when a fish, not shown, pulls fishing line 42, a circuit 46 (FIG. 4) is completed momentarily by a contact 48 that forms a spring-loaded second switch SW2 (FIG. 4).

Figure 3:
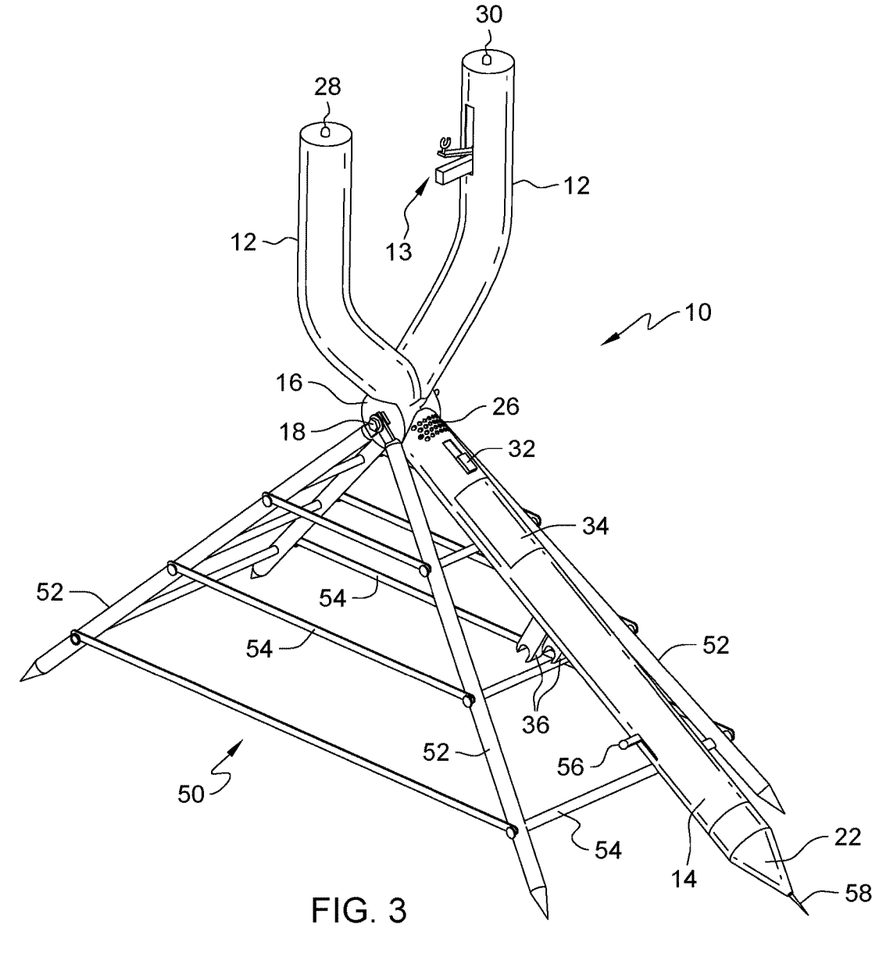
FIG. 3 is a schematic view of another embodiment of the fish bite alert system in which a ladder assembly supports the fish bite alert system.
Figure 3A:
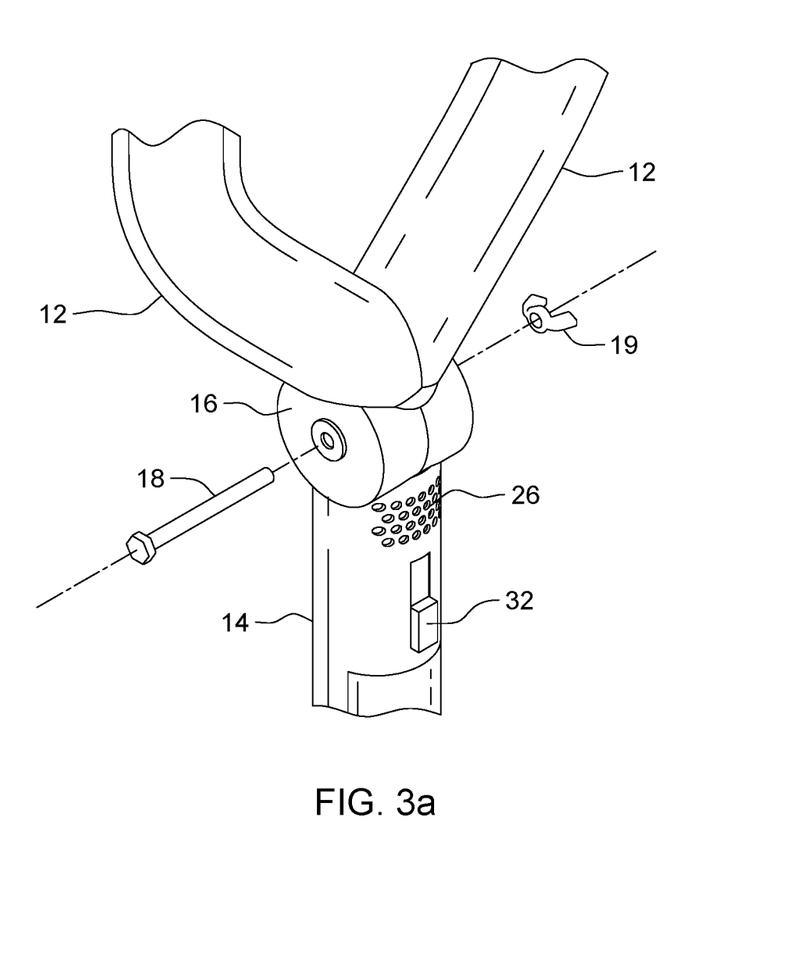
FIG. 3a is an enlarged schematic view of the rotatable joint and joining screw shown in FIG. 3.

Referring now to FIGS. 3 and 3a, there are shown a schematic view (FIG. 3) of another embodiment of fish bite alert system 10 and an enlarged view (FIG. 3a), in which a ladder assembly 50 supports the device. In this embodiment, vertical post 14 need not be inserted into the ground, not shown. For example, when fish bite alert system 10 is positioned on a wooden dock, insertion of threaded cone 22 is neither advised nor lawful in many places.

A folding ladder base 52 having three legs extends from rotatable joint 16 and ladder joining screw 18. When ladder joining screw 18 is removed from joint 16, ladder assembly 50 can be detached from the device. This is advantageous both for storage and for use of system 10 on sand, dirt, or ice. Extension arms 54 support the legs of base 52 and are secured by means well known in the art.

A slidable dock pin plunger 56 is supported by and extends from vertical post 14. Plunger 56 is operatively connected to a retractable dock pin 58. Thus, vertical movement of slidable dock pin plunger 56 extends and retracts dock pin 58.

Referring now also to FIG. 4, there is shown a schematic circuit diagram 60 of the electrical part of fish bite alert system 10. Batteries are connected via power switch 32 and spring-loaded trigger assembly 13 (FIG. 1) to speaker 26 and LEDs 28, 30, as shown. In an alternative embodiment, each of speaker 26 and/or LEDs 28, 30 can be de-energized with suitable switches, not shown.

In operation, when power switch 32 is turned ON and a fishing rod 40 and fishing line 42 are configured as shown in FIG. 2, the system 10 is operational. When a fish, not shown, strikes hook 44, fishing line 42 is pulled so as to activate and contact trigger assembly 13, turning momentary contact switch SW2 ON. This action, in turn, energizes both speaker 26 and LEDs 28, 30, signaling to the fisherman or woman that a fish has struck hook 44, lure, or bait.

Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Having thus described the invention, what is desired to be protected by Letters Patent is presented in the subsequently appended claims.

What is claimed is:

1. A fish bite alert system, comprising:
    a) a standalone fishing rod holder having two upper, longitudinal portions, each longitudinal portion having a distal end and a proximal end, the proximal ends thereof being rotatably connected to a vertical post having a proximal end and a distal end, the vertical post extending from the proximal ends of the upper, longitudinal portions of the fishing rod holder in combination with the vertical post-forming a Y shape, and a removable cone disposed proximate the distal end of the vertical post;
    b) an electrical speaker unit mounted to the fishing rod holder;
    c) an LED attached to each of the upper portions of the fishing rod holder;
    d) a power supply disposed in the vertical post and electrically connected to the electrical speaker unit and to each of the LEDs; and
    e) a retractable, spring-loaded trigger assembly having a U-shaped support, the trigger assembly being operatively attached to only one of the two upper, longitudinal portions of the fishing rod holder and electrically connected to the power supply via a momentary switch, the spring-loaded trigger assembly having a protrusion being swivable perpendicular to the attached rod holder portion between a substantially horizontal extended position and a substantially vertical retracted position and a U-shaped support attached to the protrusion for guiding a fishing line, wherein the protrusion is configured to be positioned at an angle above the horizontal such that when the fishing line is pulled the fishing line contacts the U-shaped support, moving the protrusion to the substantially horizontal position and signaling a fish catch.

2. The fish bite alert system in accordance with claim 1, wherein the power supply comprises at least one dry cell battery.

3. The fish bite alert system in accordance with claim 2, wherein the at least one dry cell battery comprises at least one battery selected from the group: size AA batteries and size AAA batteries.

4. The fish bite alert system in accordance with claim 1, wherein the distal end of the vertical post comprises threads and the removable cone is threadably connected thereto.

5. The fish bite alert system in accordance with claim 1, wherein each of the speaker and the LEDs is separately energized.

6. The fish bite alert system in accordance with claim 1, further comprising a power switch.

7. The fish bite alert system in accordance with claim 6, wherein the power switch, the momentary switch, the power supply, the speaker unit, and the LEDs are electrically connected in series.

8. The fish bite alert system in accordance with claim 1, further comprising a retractable dock pin housed in the removable cone.

9. A fish bite alert system, comprising:
    a) a standalone fishing rod holder having two upper, longitudinal portions, each longitudinal portion having a distal end and a proximal end, the proximal ends thereof being rotatably connected to a vertical post having a proximal end and a distal end, the vertical post extending from the proximal ends of the upper, longitudinal portions of the fishing rod holder in combination with the vertical post-forming a Y shape, and a removable cone disposed proximate the distal end of the vertical post;

b) electrical signaling means mounted to the Y-shaped fishing rod holder;

c) a power supply disposed in the vertical post and electrically connected to the electrical signaling means;

d) a retractable, spring-loaded trigger assembly having a U-shaped support, the trigger assembly being operatively attached to one of the two upper, longitudinal portions of the fishing rod holder and electrically connected to the power supply via a momentary switch, the spring-loaded trigger assembly having a protrusion being swivable perpendicular to the attached rod holder portion between a substantially horizontal extended position and a substantially vertical retracted position and a U-shaped support attached to the protrusion for guiding a fishing line, wherein the protrusion is configured to be positioned at an angle above the horizontal such that when the fishing line is pulled the fishing line contacts the U-shaped support, moving the protrusion to the substantially, horizontal position and signaling a fish catch; and e) a ladder assembly supporting the fishing rod holder and comprising a folding ladder base with extendable support members having distal ends and a plurality of extension arms operatively connected thereto.

10. The fish bite alert system in accordance with claim 9, wherein the power supply comprises at least one dry cell battery.

11. The fish bite alert system in accordance with claim 9, further comprising a power switch.

12. The fish bite alert system in accordance with claim 11, wherein the power switch, the power supply, and the electrical signaling means are electrically connected in series.

13. The fish bite alert system in accordance with claim 9, wherein the electrical signaling means is selected from a group consisting of: LEDs and a speaker.

14. The fish bite alert system in accordance with claim 9, further comprising a plurality of removable cones operatively connected to respective distal ends of the extendable support members.

15. The fish bite alert system in accordance with claim 14, further comprising a plurality of retractable dock pins respectively housed in the removable cones.

* * * * *